US00RE45844E

(19) United States
(12) Reissued Patent
Long

(10) Patent Number: US RE45,844 E
(45) Date of Reissued Patent: Jan. 19, 2016

(54) WATER JET MECHANISM FOR WHIRLPOOL EFFECT IN PEDICURES OR OTHER APPLICATIONS

(71) Applicant: LEXOR, INC., Westminster, CA (US)

(72) Inventor: Christopher L. Long, Baltimore, MD (US)

(73) Assignee: Lexor, Inc., Westminster, CA (US)

(21) Appl. No.: 13/946,899

(22) Filed: Jul. 19, 2013

Related U.S. Patent Documents

Reissue of:
(64) Patent No.: 8,272,079
Issued: Sep. 25, 2012
Appl. No.: 11/544,363
Filed: Oct. 6, 2006

U.S. Applications:
(63) Continuation of application No. 13/910,977, filed on Jun. 5, 2013, now abandoned, which is an application for the reissue of Pat. No. 8,272,079, which is a continuation-in-part of application No. 11/312,907, filed on Dec. 20, 2005, now abandoned.

(51) Int. Cl.

| | |
|---|---|
| ***A61H 33/04*** | (2006.01) |
| ***A47K 3/00*** | (2006.01) |
| ***A47K 3/022*** | (2006.01) |
| ***A61H 35/00*** | (2006.01) |
| ***A61H 33/00*** | (2006.01) |

(52) U.S. Cl.
CPC ..... *A61H 33/0087* (2013.01)

(58) Field of Classification Search
CPC . A61H 35/006; A61H 35/00; A61H 33/6021; A47K 3/022
USPC ..... 4/622, 541.1–541.6
See application file for complete search history.

(56) References Cited

U.S. PATENT DOCUMENTS

| | | | | |
|---|---|---|---|---|
| 3,591,872 | A | 7/1971 | Vanegas et al. | |
| 4,726,917 | A | 2/1988 | Abe | |
| 4,805,664 | A * | 2/1989 | Mattei et al. | 137/543.23 |
| 5,386,598 | A * | 2/1995 | Mersmann | 4/541.4 |
| 5,862,543 | A | 1/1999 | Reynoso et al. | |
| 5,941,275 | A | 8/1999 | Laing | |
| 6,860,437 | B1 * | 3/2005 | Amendt et al. | 239/383 |
| 6,944,893 | B1 * | 9/2005 | Mattson et al. | 4/541.1 |
| 7,108,202 | B1 * | 9/2006 | Chang | 239/380 |
| 7,111,334 | B2 | 9/2006 | Chen | |
| 8,272,079 | B2 | 9/2012 | Long | |
| 2005/0120473 | A1 | 6/2005 | Southon et al. | |

* cited by examiner

*Primary Examiner* — Huyen Le
*Assistant Examiner* — Christine Skubinna
(74) *Attorney, Agent, or Firm* — Klein, O'Neill & Singh, LLP

(57) ABSTRACT

A whirlpool foot bath for a pedicure chair having a housing with a removable cap and a rotor and stator magnetic motor within the housing. Water in the bath is circulated through an inlet in the cap and out through at least one outlet in the cap. A method of use is described.

30 Claims, 23 Drawing Sheets

Amended

Amended

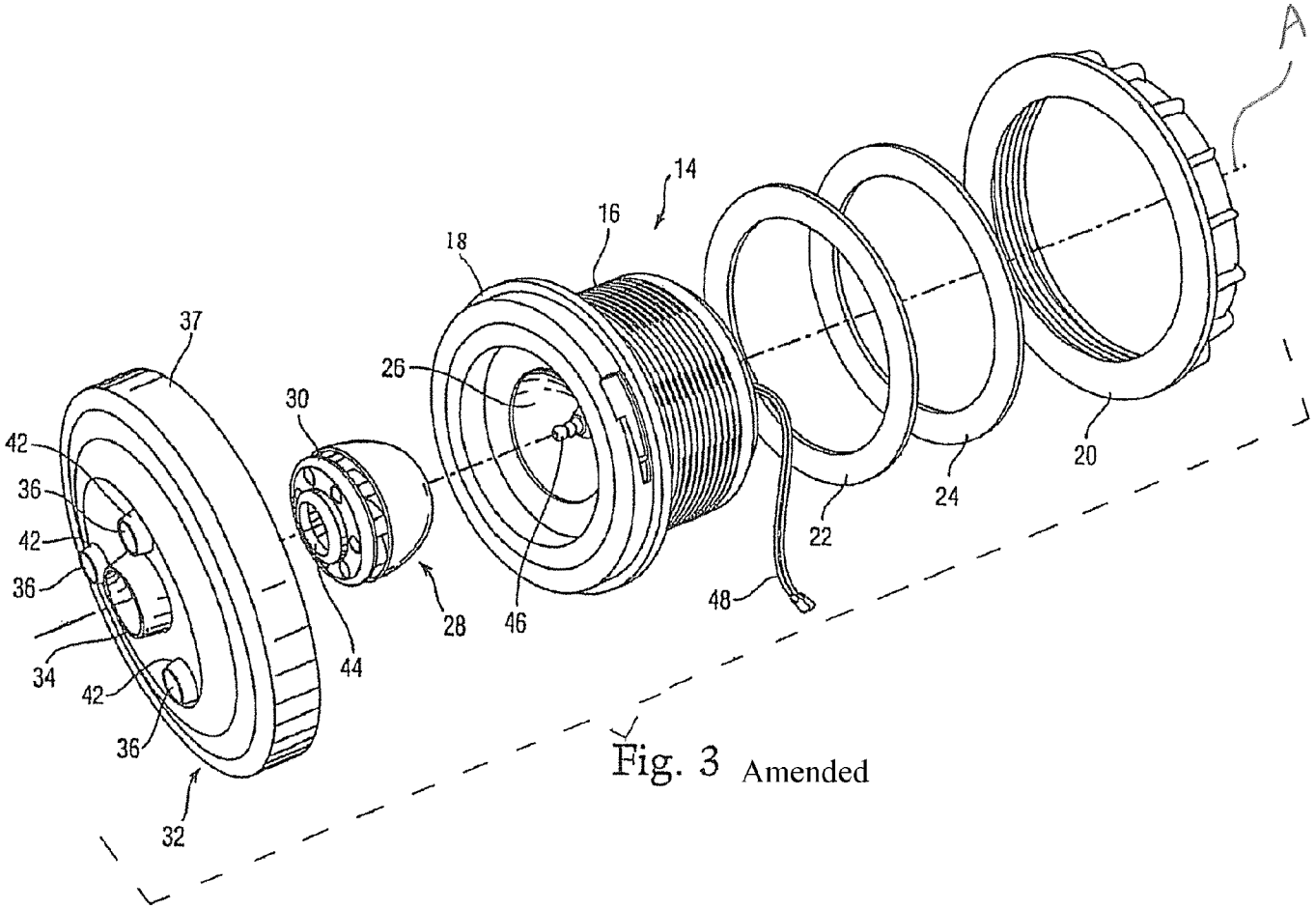
Fig. 3 Amended

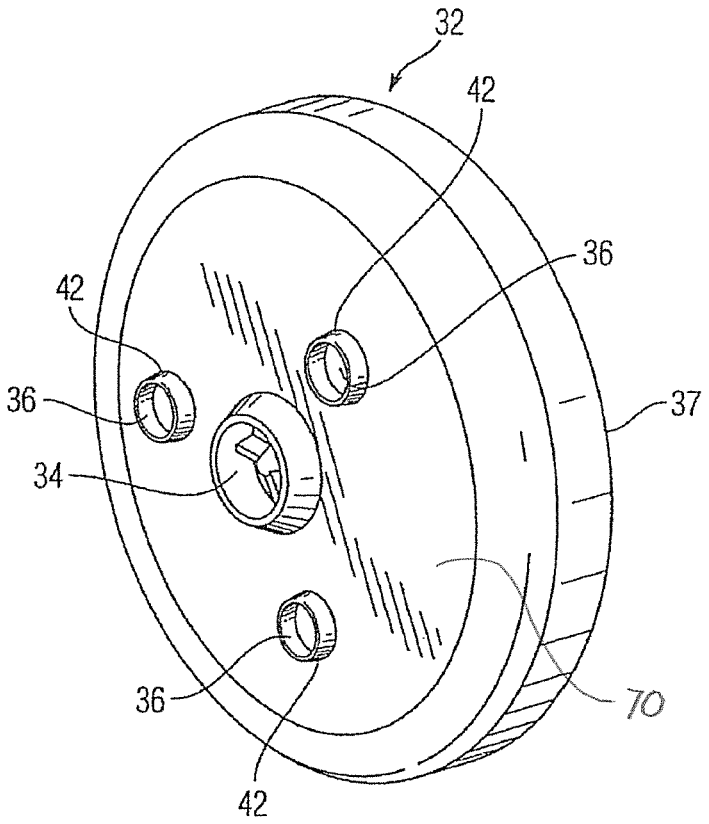
Fig. 7 Amended

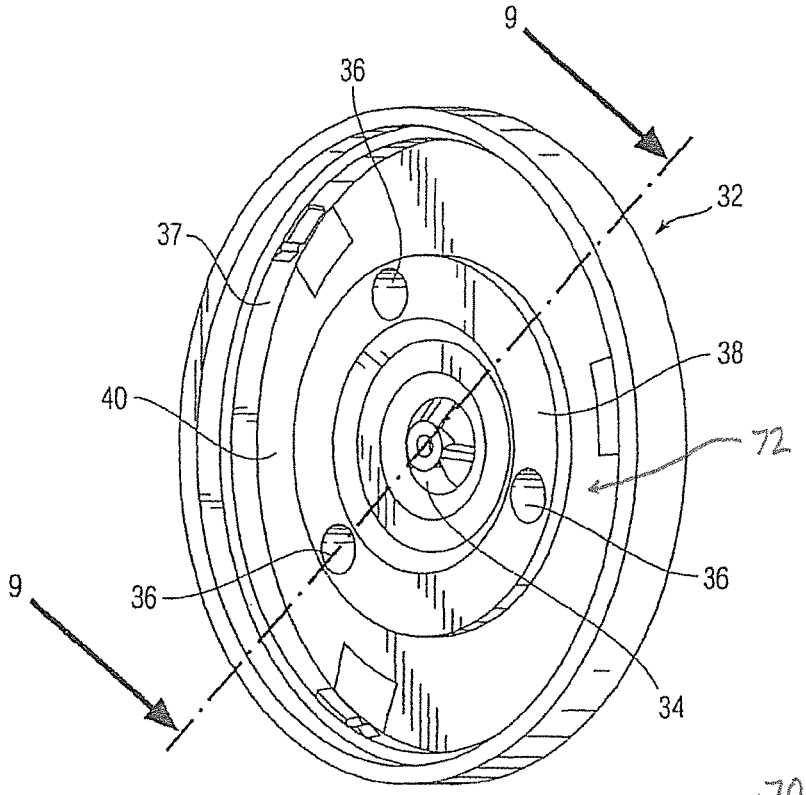
Fig. 8 Amended
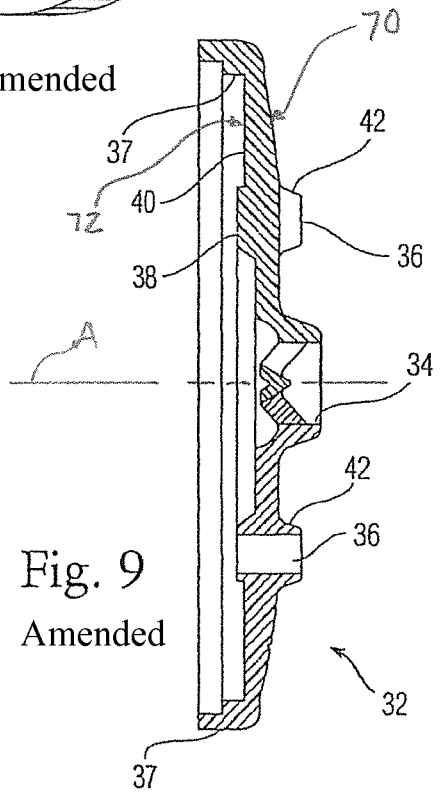
Fig. 9
Amended

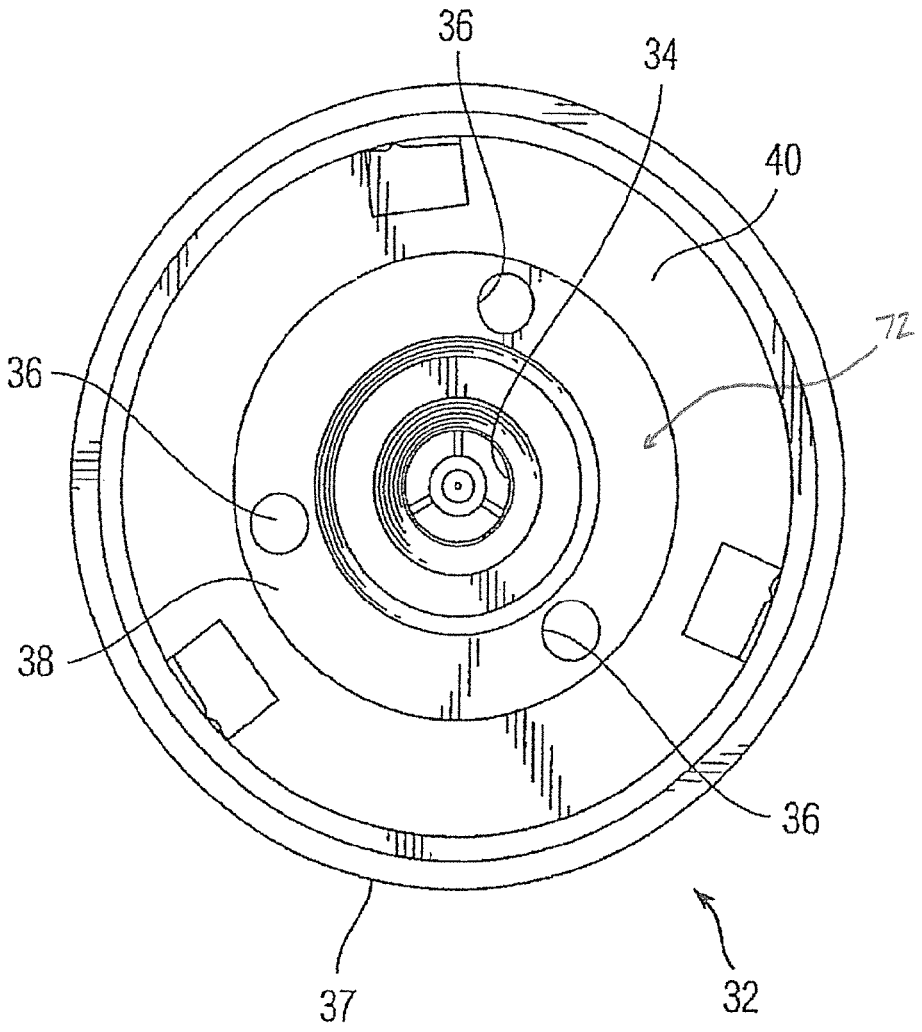
Fig. 10 Amended 14-1

14-2

14-3

14-4

14-5

14-6

14-7

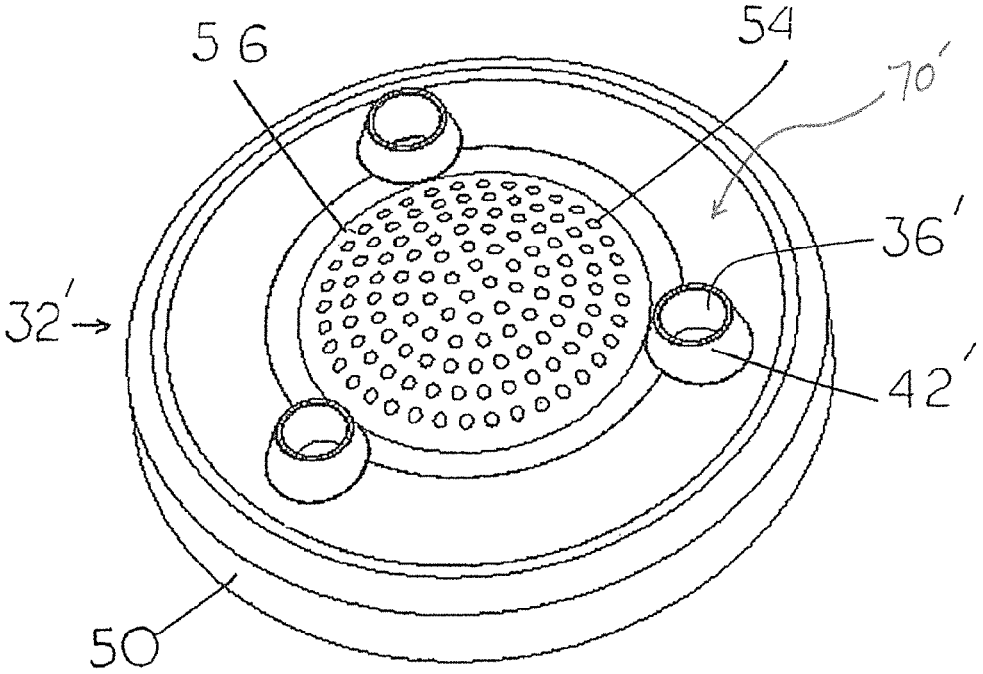
FIG 17 Amended

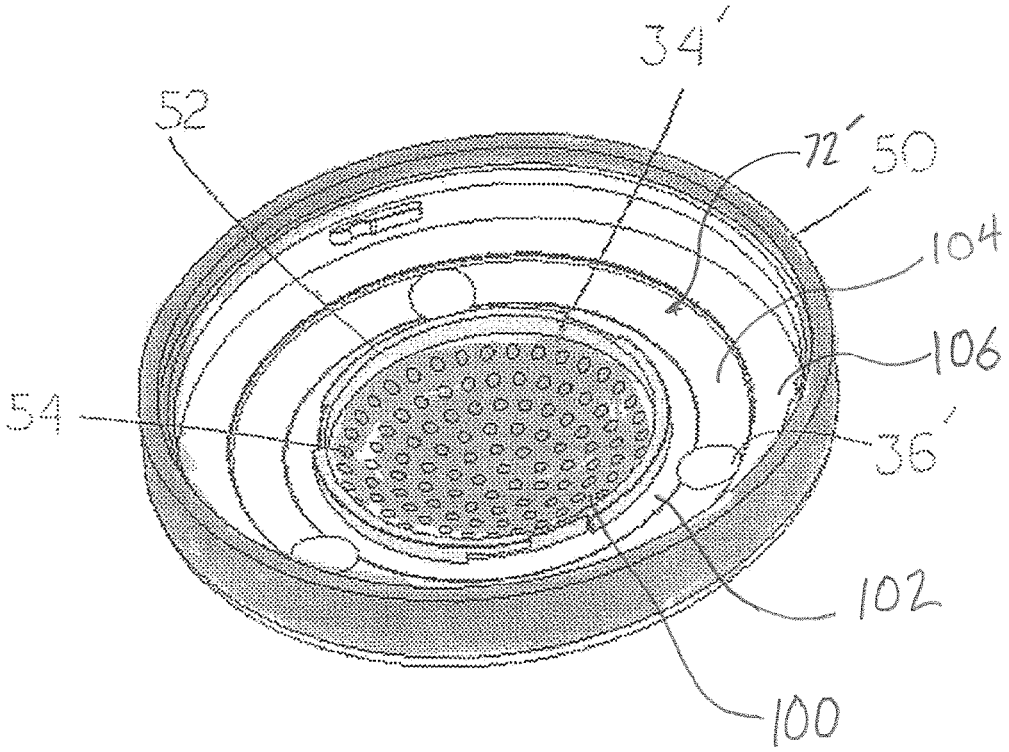
FIG 18 Amended

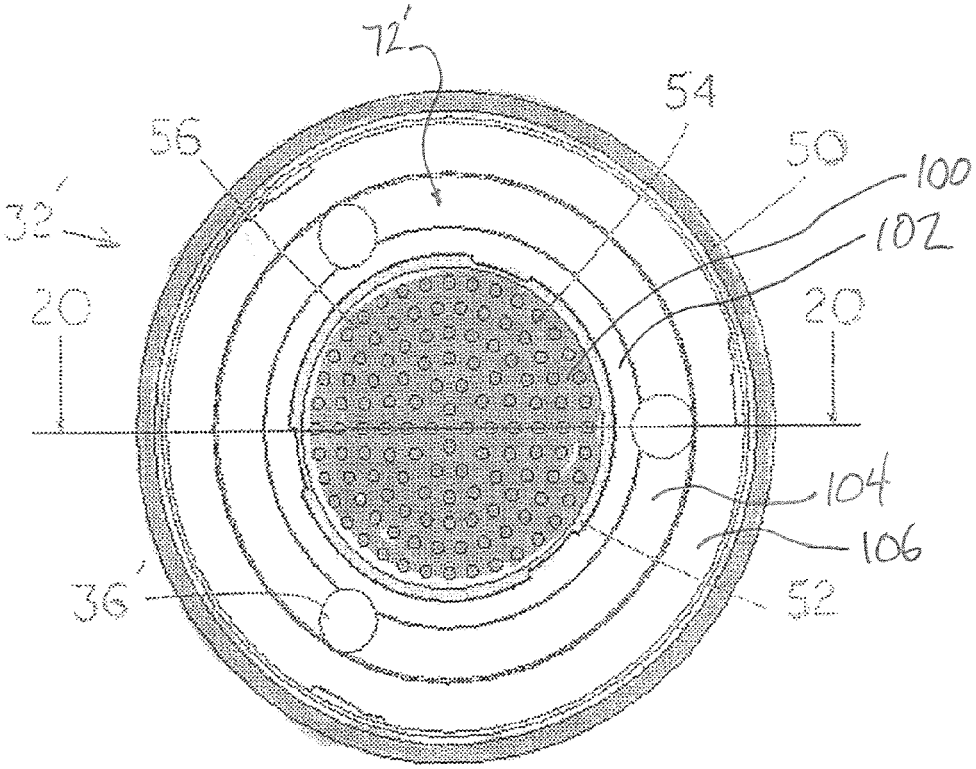
FIG 19 Amended
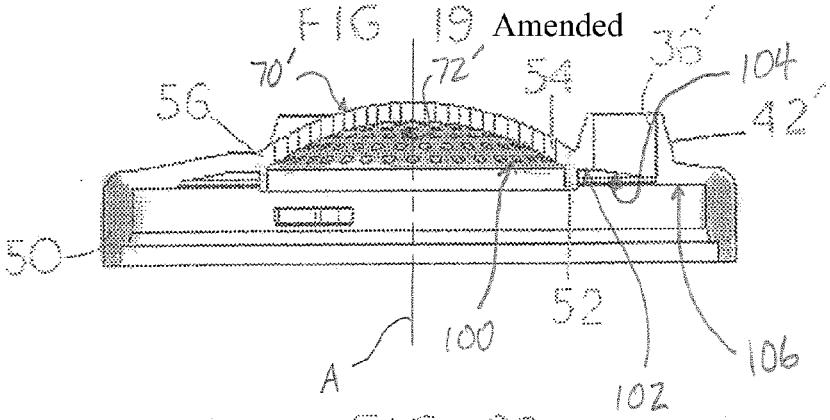
FIG 20 Amended

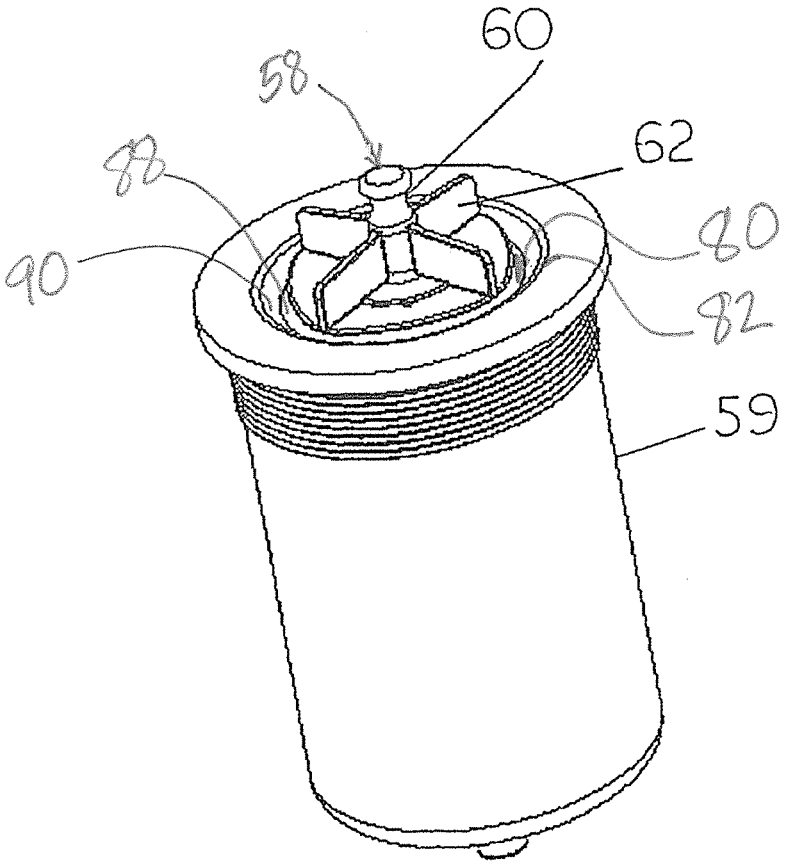
FIG 21 Amended

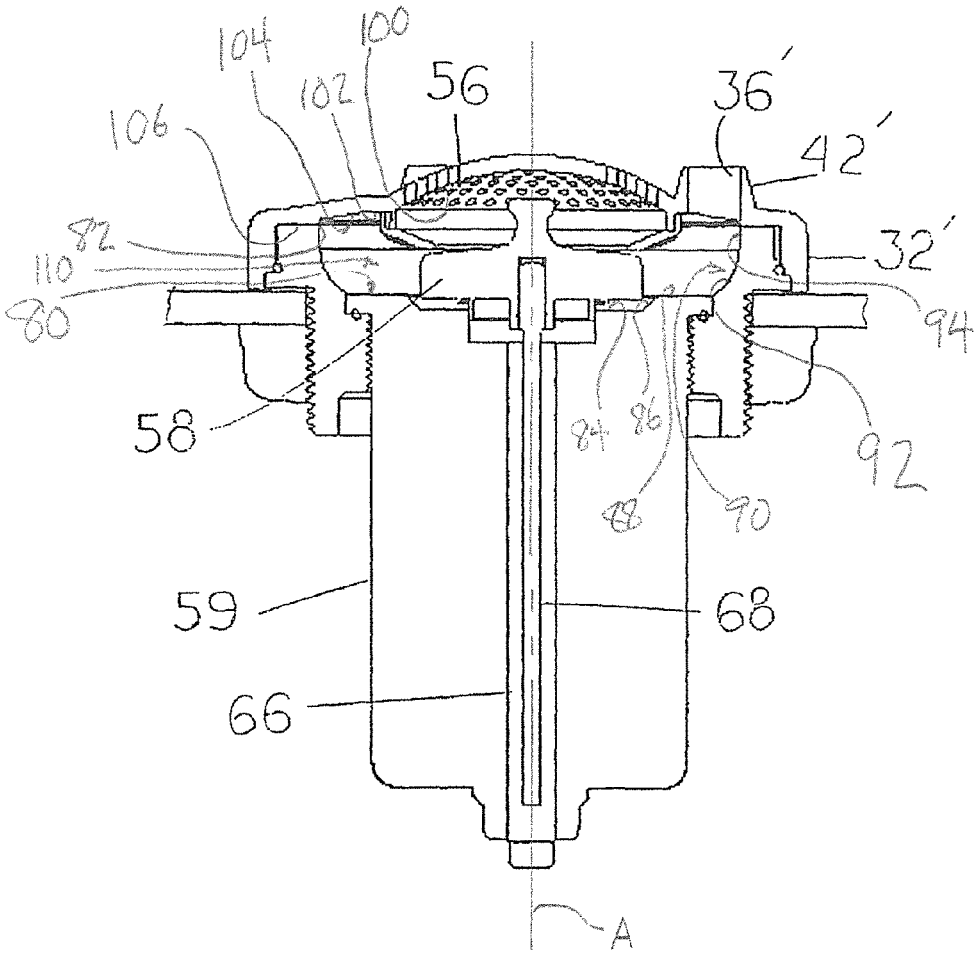
FIG 27 Amended

WATER JET MECHANISM FOR WHIRLPOOL EFFECT IN PEDICURES OR OTHER APPLICATIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

*More than one reissue application has been filed for the reissue of U.S. Pat. No. 8,272,079. The reissue applications are the present application and application Ser. No. 13/910,977.*

This application *is a continuation reissue of application Ser. No. 13/910,977, which is an application for reissue of U.S. Pat. No. 8,272,079, which* is a continuation-in-part of application Ser. No. 11/312,907 filed Dec. 20, 2005 now abandoned. The contents and disclosure of which are hereby incorporated by reference herein in their entirety.

BACKGROUND OF THE INVENTION

1. Field of the Invention

The present invention relates to a water jet mechanism and method of use in a pedicure and more particularly, to a motor in a housing having a cap.

2. Description of Related Art

It is known to have a pedicure chair with a basin for bathing the feet of a person (U.S. Patent D454,705 to Long). These types of pedicure chairs have a pipe system to introduce water into, and remove water from, the basin. The water is circulated by a conventional motor-driven, shaft mounted, fan. There is frequently water leakage around the shaft requiring maintenance. Also, the pipe system is subject to accumulation of dirt, mold and bacteria and is very difficult to clean and sterilize after use by each customer. There is the possibility of health concerns, safety and anxiety of customers.

A water circulation unit having a stator which creates a rotating magnetic field and is separated from the water by a magnetically permeable wall and a rotor on the opposite side of the wall is disclosed in U.S. Pat. No. 5,941,225 to Laing. This unit is part of a hot water distribution system which circulates cooled down hot water away from a spigot and brings in hot water such that hot water is always immediately available at the spigot.

Other water circulation means known to persons skilled in the art may also be used. A single phase synchronous motor made by Hanning Elektro-werks (Model DPO 40-020) has been used for several years in washing machines and has proven to be reliable and efficient.

There is a need for a circulating system for water in a pedicure bath which provides adequate movement of the water and which can be cleaned and sterilized rapidly and effectively to provide for the health and anxiety of persons using the pedicure bath.

SUMMARY OF THE INVENTION

It is an object of the invention to provide a system for circulating water in a bath used in a pedicure, a Jacuzzi and a whirlpool bath, the system being rapidly and easily cleaned and sanitized.

It is a further object of the invention to provide a method of preparing for use a bath used in a pedicure, a jacuzzi and a whirlpool bath.

In accordance with the teachings of the present invention, there is disclosed an improvement to a pedicure chair having a whirlpool foot bath provided with a basin, wherein water is continually ejected through respective first pipes into the basin and is thereafter withdrawn therefrom through respective second pipes and wherein mold or bacteria may tend to accumulate in the pipes, such that cleaning or sterilizing the pipes after each customer becomes difficult and time consuming, and such that customer health problems or anxieties occur. The improvement has a means for filling the basin with fresh water initially, at least one induction motor and combination pump mounted in a housing on the basin and having a removable cap provided with at least one inlet opening and at least one outlet opening for communication with the basin. In this manner, the fresh water is sucked out of the basin through the inlet opening and thereafter is discharged out of the at least one outlet opening for continually recirculating the water in the basin and thereby creating a whirlpool action therein. The induction motor and combination pump has a stator and further has a magnetically-retained rotor. After each customer, the cap may be removed, the rotor manually pulled away from the stator, and the pump quickly and conveniently cleaned or sterilized. Thereafter, the magnetically-retained motor and the cap may be easily replaced, thereby saving considerable time between customers, substantially improving customer safety, and removing customer anxieties and health concerns. The removable cap has an inner surface and an outer surface. A rim is formed circumferentially about the inner surface. The at least one inlet opening is formed centrally within the cap. A circular wall is formed on the inner surface surrounding the inlet opening. The at least one outlet opening is formed through the cap between the inlet opening and the rim. The outer surface of the cap has a circumferential wall formed about the at least one outlet opening. The wall extends outwardly from the top surface of the cap forming a nozzle thereon, such that water expelled radially from the rotor is directed axially through the at least one outlet and projected from the nozzle into the basin.

In further accordance with the teachings of the present invention, there is disclosed a jet pump mounted in a basin of a pedicure chair, jacuzzi or whirlpool bath wherein water is circulated. The jet pump has a housing having an externally accessible removable cap. The cap has an outer surface and an inner surface. A rim is formed circumferentially about the inner surface. An inlet opening for water is formed centrally within the cap, a circular wall being formed on the inner surface surrounding the inlet opening. At least one outlet for water is formed through the cap between the wall around the inlet opening and the rim. The inlet opening has a plurality of spaced-apart holes arranged in a series of concentric circles. A motor having a stator and a magnetically coupled rotor is disposed within the housing, the rotor being received within the central portion of the cap. When the motor is activated, the rotor rotates drawing water through the water inlet and expelling the water radially against the wall around the inlet opening, the water circulating within the cap and being directed axially outwardly through at least one outlet.

These and other objects of the present invention will become apparent from a reading of the following specification taken in conjunction with the enclosed drawings.

BRIEF DESCRIPTION OF THE DRAWINGS

FIG. 3 is an exploded view of the present invention.

FIG. 7 is a perspective view of the outer surface of the cap to the housing.

FIG. 8 is a perspective view of the inner surface of the cap of the housing.

FIG. 9 is a cross-section view taken across the lines 9-9 of FIG. 8.

FIG. 10 is a plan view of the inner surface of the cap of the housing.

FIG. 17 is a perspective view of the top of the alternative cap to the housing.

FIG. 18 is a perspective view of the bottom of the alternative cap to the housing.

FIG. 19 is a bottom plan view of the alternative cap to the housing.

FIG. 20 is a cross-sectional view taken across the lines 20-20 of FIG. 19.

FIG. 21 is a perspective view of the motor having an impeller used with the alternative cap to the housing.

FIG. 27 is a cross-sectional view taken across the lines 27-27 of FIG. 26.

DESCRIPTION OF THE PREFERRED EMBODIMENTS

Figure 1:
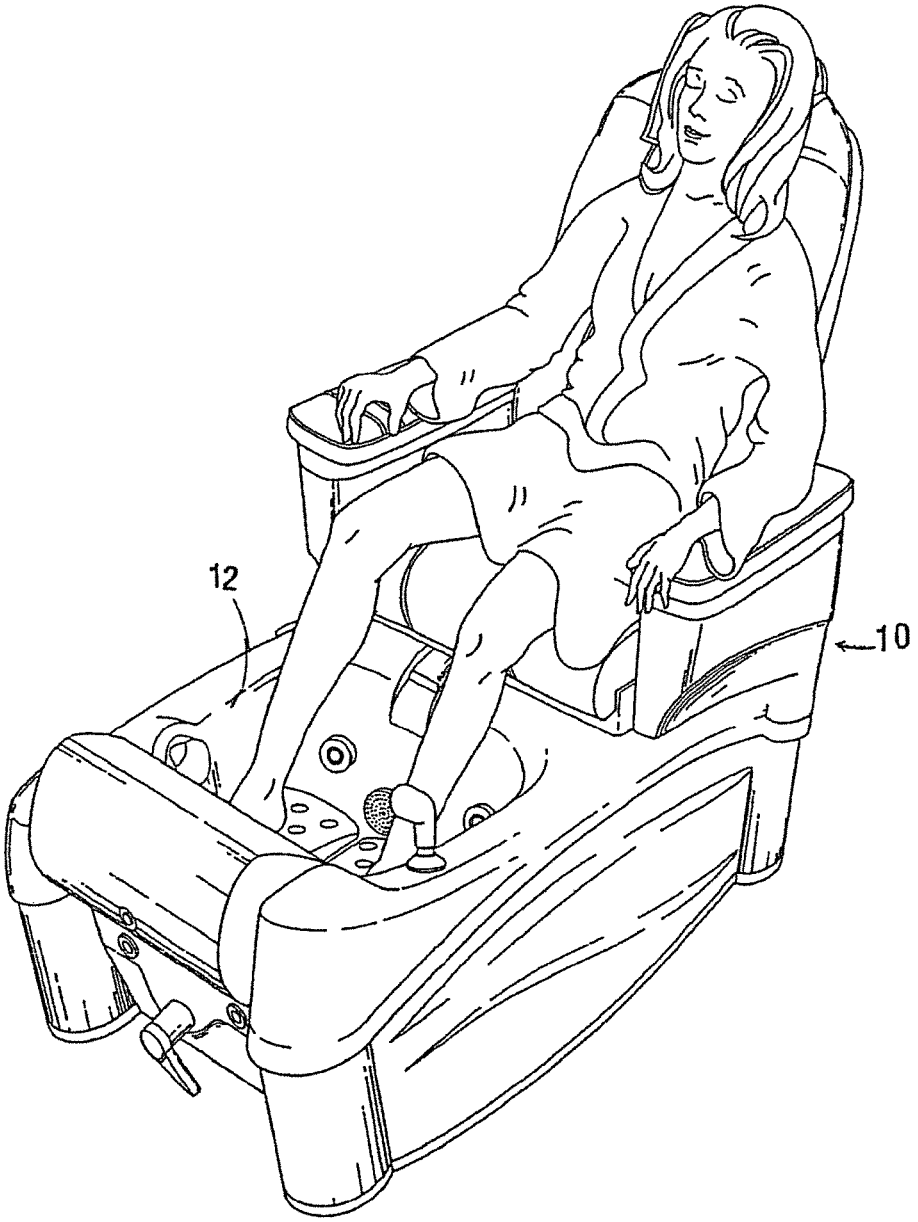
PRIOR ART Fig 1
FIG. 1 is a perspective view of a person seated in a pedicure chair with their feet in the basin.
Figure 2:
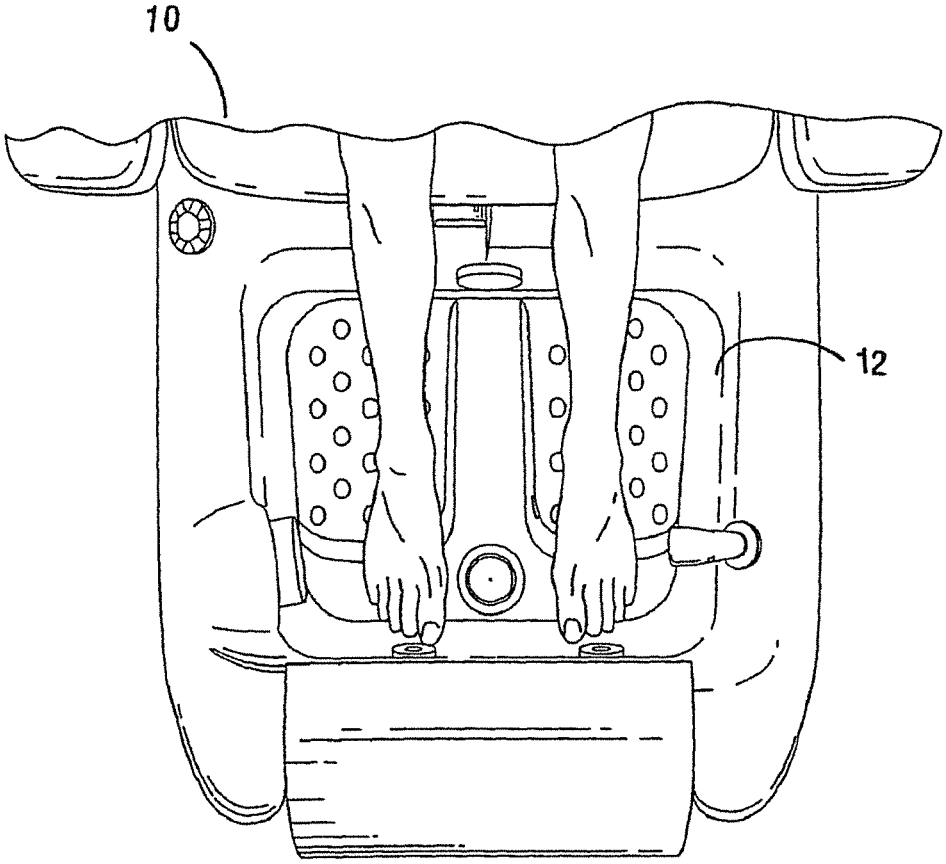
PRIOR ART Fig. 2
FIG. 2 is a top view of the basin showing the person's feet in the bath opposite from a water pump.

As shown in FIGS. 1 and 2, persons receiving a pedicure are usually seated in a pedicure chair 10 which has a basin 12 in which the person's feet are placed. Water is circulated in the basin 12 and is directed at the person's feet.

Figure 5:
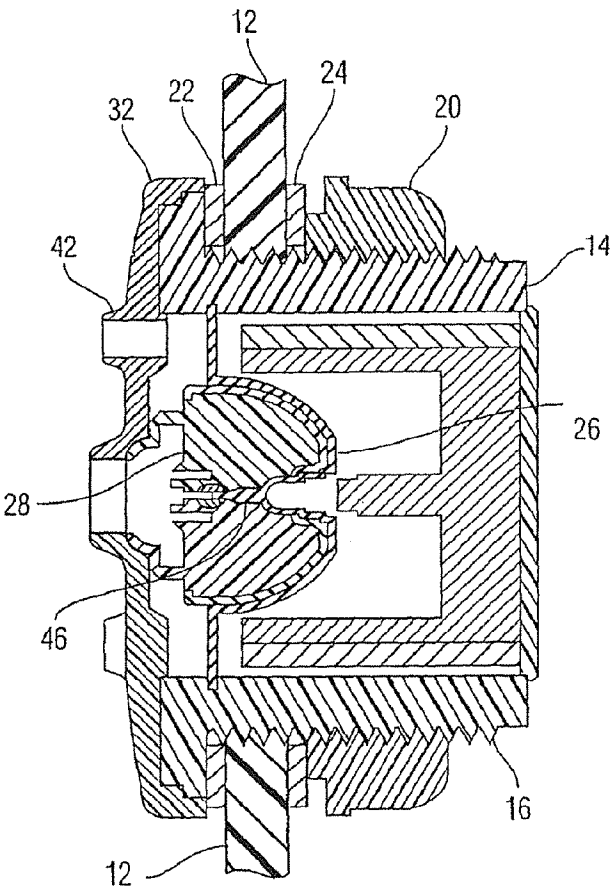
FIG. 5 is a cross section view showing the mounting of the housing in the basin.
Figure 4:
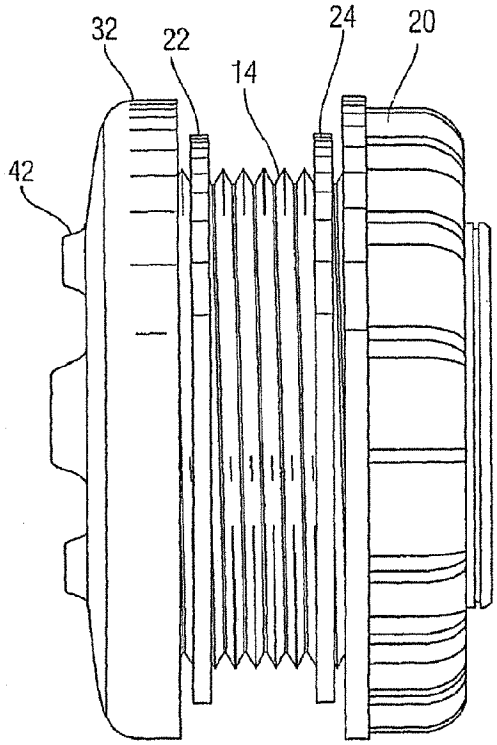
FIG. 4 is a side view of the threaded housing on which are mounted a screw ring and ring seals.

The jet pump of the present invention is shown in FIG. 3 *exploded along an axis A*. As shown in FIGS. 4-5, a housing 14 has external threads 16 formed thereon. The first end of the housing has an enlarged shoulder 18 formed thereon. A cooperating threaded screw ring 20 is mounted on the threaded housing 14. A first seal ring 22 is disposed adjacent to the enlarged shoulder 18 on the housing and a second seal ring 24 is disposed adjacent to the screw ring 20. The basin 12 has an opening formed in the sidewall or bottom of the basin and the housing 14 is received in the opening with the seal rings 22, 24 on either side of the opening in the sidewall of the basin. Tightening of the screw ring 20 against the basin forms a watertight seal with the respective first seal ring 22 and second seal ring 24 between the basin and the housing. More than one jet pump may be mounted in the basin to provide more efficient circulation of water.

Figure 6:
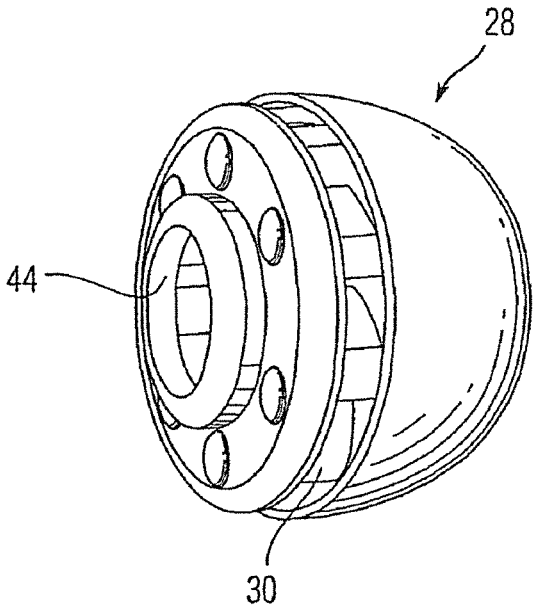
FIG. 6 is a perspective view of the rotor separated from the stator.

An induction motor is mounted in the housing 14. The induction motor has an electrically activated stator 26 and a permanent magnet rotor (FIG. 6). A motor which has been used satisfactorily is Model D4K-67 supplied by Laing Thermotech, Inc., San Diego, Calif. In a preferred embodiment, the stator has a well formed therein, the opening of the well being oriented toward the basin 12. The rotor has a semi-spherical shape which is received in the well in the stator 26. The rotor 28 may have a central bore 44 thereon and the well may have a post 46 formed centrally therein such that the rotor is always properly seated in the well. The motor has no propeller shaft. The motor has a lifetime in excess of 10,000 hours and is powered by direct current using up to 24V. The rotor 28 preferably has a plurality of vanes 30 formed circumferentially therein. When the motor is energized, water in the housing 14 is directed radially from the rotor 28 due to the rotation of the rotor and the vanes in the rotor.

The present invention is not limited to use with an induction motor. A single plane synchronous motor 59 such as Model DPO 40-020 available from Hanning Elektro-werks GmbH & Co. has been used successfully (FIGS. 21-27). This motor has an impeller 58 mounted on the end of a drive shaft. The impeller 58 is manually removable from the motor for cleaning between use by each person using the pedicure chair. Preferably, the impeller 58 has a [surface] *base* 60 with a plurality of vanes 62 formed on a first side. A pocket 64 is formed on a second side of the [surface] *base* 60 forming a watertight seal around a bore 66 which is formed in the motor. A drive shaft 68 is connected to the second side of the [surface] *base* 60 of the impeller 58. The drive shaft 68 *extends along an axis A of the motor 59,* passes through the gasket 64 and is received in the bore 66 in the motor.

Figure 26:
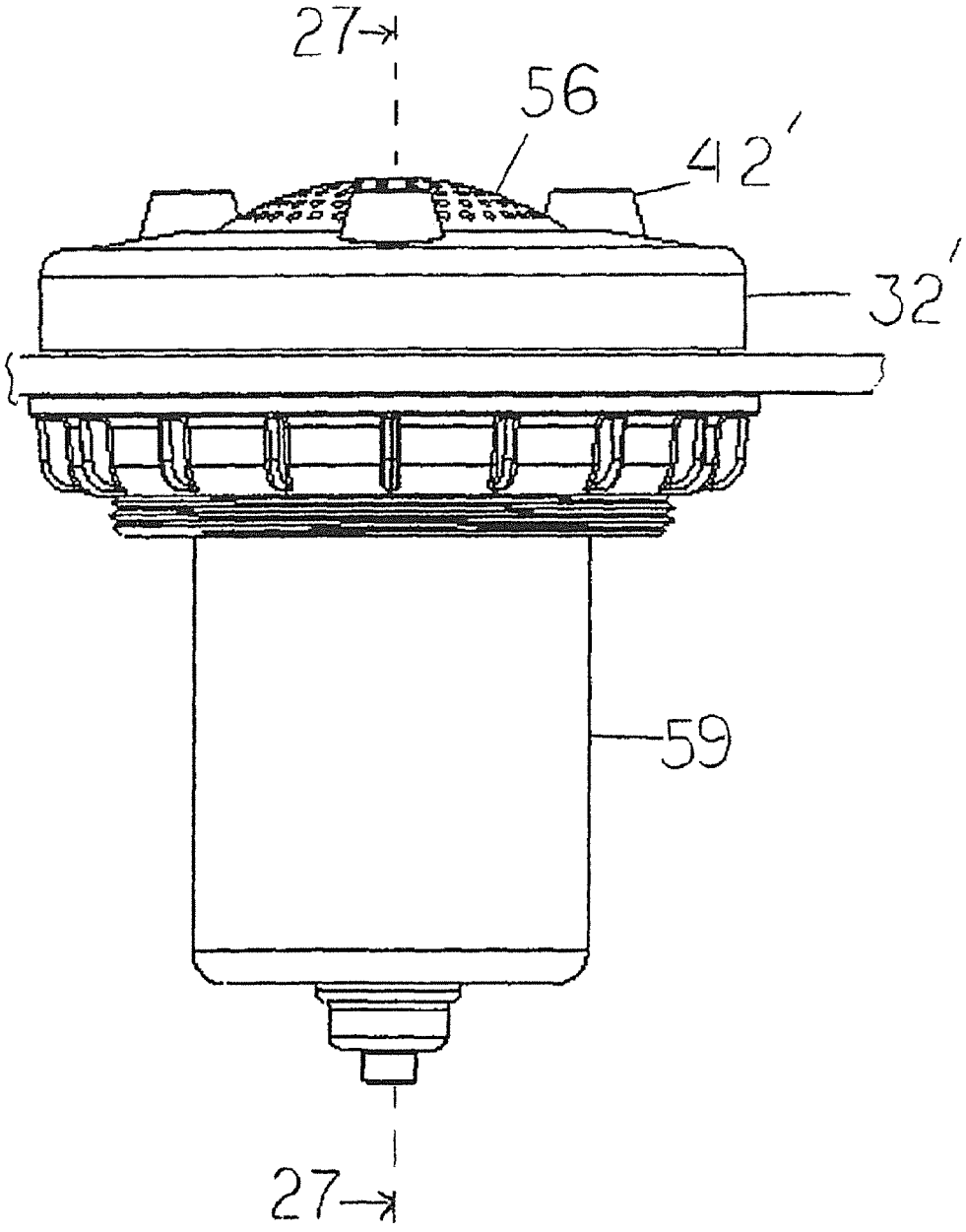
FIG. 26 is a side elevation view of the motor in the housing with the alternative cap mounted in the basin.

*With particular reference to FIGS. 21, 26 and 27, in the illustrated embodiment a housing 14' for the motor 59 has a housing inner surface 80 terminating at a circular outer edge 82 that is unbroken about its circumference. An inner portion 84 of the housing inner surface 80 is flat and normal to the axis A. As such, the inner portion 84 has the same slope as a reference plane that can be defined normal to the axis A. The inner portion 84 of the housing inner surface 80 is generally below the base 60 of the impeller 58. An inclined portion 86 of the housing inner surface 80 is disposed radially outwardly from the inner portion 84, and is inclined relative to the reference plane and the inner portion 84. In the illustrated embodiment the inclined portion 86 has a constant slope moving radially outwardly. A medial portion 88 of the housing inner surface 80 is also flat and normal to the axis A, and is disposed radially outwardly from the inner portion 84. An outer portion 90 of the housing inner surface 80 is disposed radially outwardly from the medial portion 88. An outer inclined part 92 of the outer portion 90 is inclined relative to the medial portion 88. In the illustrated embodiment the outer inclined part 92 curves. Thus, a slope of the outer inclined part 92 increases moving radially outwardly. An outer edge part 94 of the outer portion 90 is disposed immediately adjacent the outer edge 82, and has a length that extends in an axial direction.*

As shown in FIGS. 7-10, the cap 32 to the housing 14 is retained on the housing with a twist lock fitting for ease of manual attachment and removal. In the central portion of the cap 32, there is an opening 34 which serves as a water inlet.

Also, there is at least one and preferably three equidistance spaced-apart, outlets 36 formed in the cap 32 outwardly of the inlet 34. An annular rim 37 is formed about the outer surface *70* of the cap 32. The inner surface of the annular rim 37 defines the circumference of the inner surface *72* of the cap 32. The inner surface *72* of the cap 32 has a raised ring 38 formed thereon. The ring 38 is oriented toward the rotor 28 and surrounds the central portion and the water inlet opening 34. Between the raised ring 38 and the outer edge of the cap 32, there is formed a trepan 40. Further formed in the raised ring 38 there is at least one, and preferably three, openings which are the outlet ports 36 or discharge ports. In the embodiment with three outlets, it is preferred that the outlets are spaced apart 120° from one another. The outlet ports 26 pass through the cap 32 and, on the outer surface *70* of the cap 32, there is a circumferential wall 42 around each outlet port 36 forming a respective nozzle.

Figure 11:
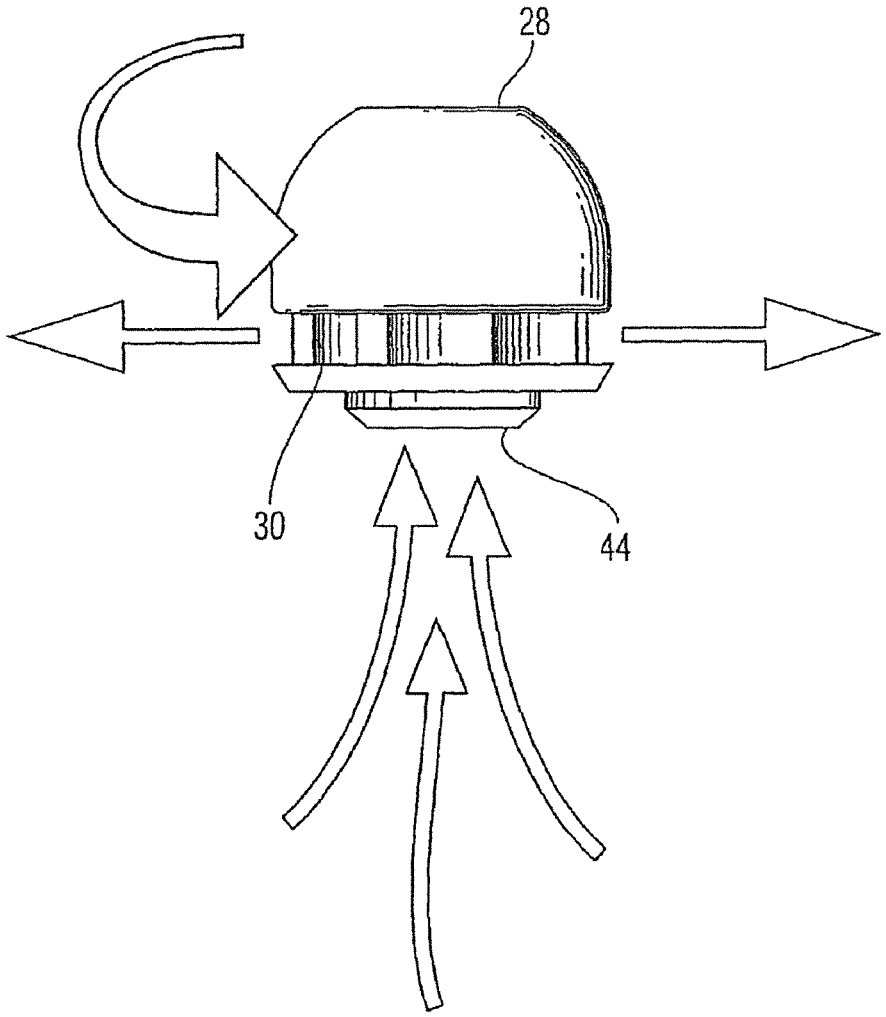
FIG. 11 is a side elevation view showing the rotor in rotation and the movement of water radially front the rotor.
Figure 12:
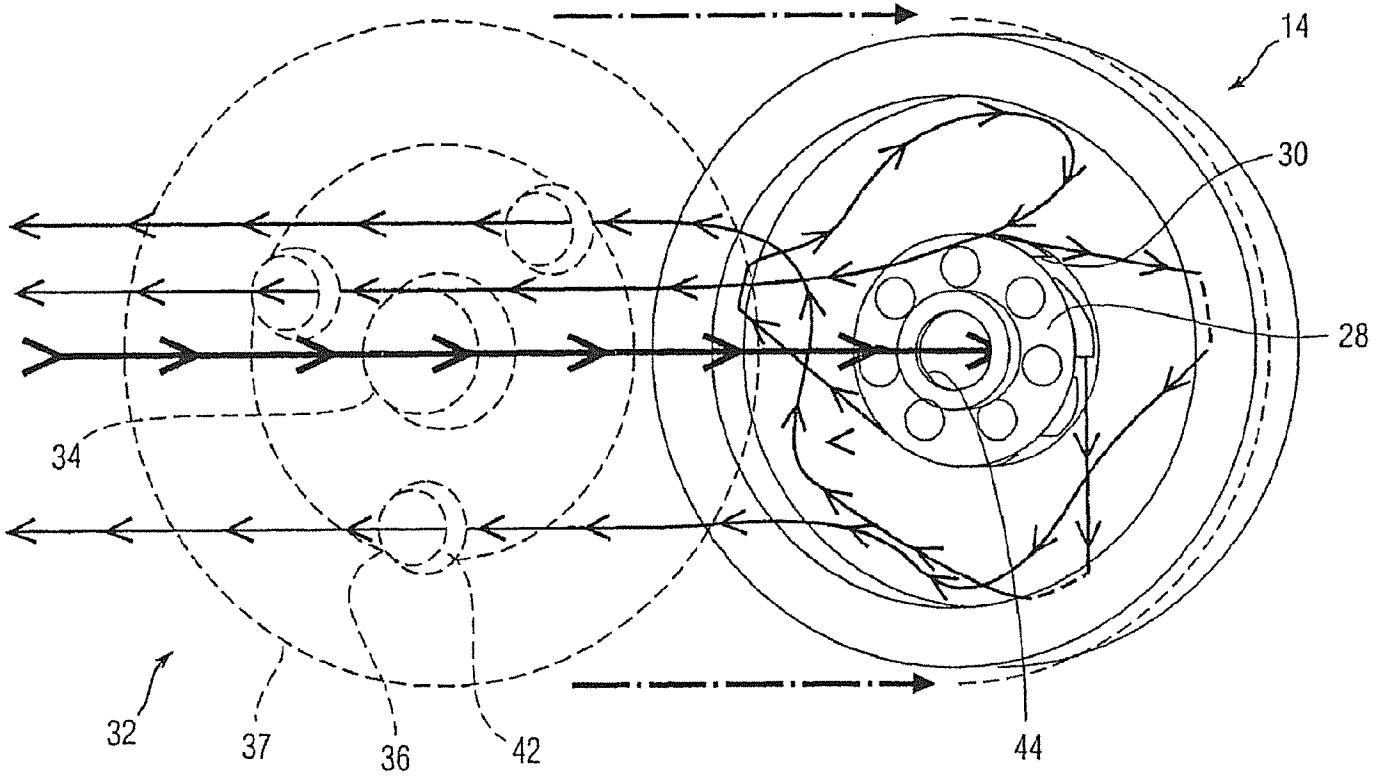
FIG. 12 is a diagram showing the movement of water within the cap.
Figure 13:
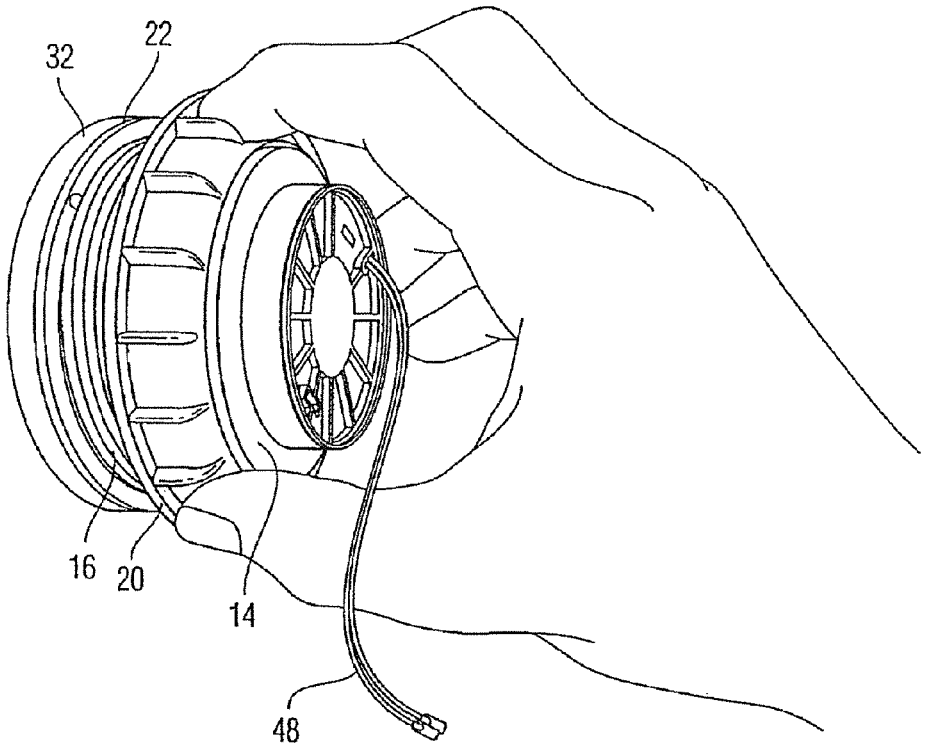
FIG. 13 is a perspective view showing removal of the back ring to access the motor for replacement.

As shown in FIGS. 11-12, water within the basin 12 is drawn into the intake opening 34 in the center of the cap 32 by rotation of the rotor 28. The vanes in the rotor 28 expel the water radially across the trepan 40. The water is contained by the annular rim 37 and circulates within the cap 32 and is directed axially through the plurality of discharge port outlets 36. When leaving the outlets 36, the circumferential wall 42 on the outlet acts as a nozzle to forcefully direct the water into the basin 12 producing agitation, circulation and a whirlpool effect on the water within the basin.

The stator 26 is electrically connected to a low DC voltage power source using a quick-disconnect fitting 48. The stator 26 is in the housing 14 with the wiring on the opposite side from the rotor 28 and distal from the basin 12, Access to the wiring is through the back or side of the pedicure chair 10 permitting servicing of the motor (FIG. 12).

Figure 14:
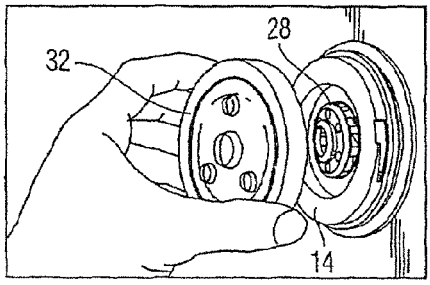
FIG. 14 is a flowchart showing the method of preparing, cleaning and using the pedicure bath.
Figure 14:
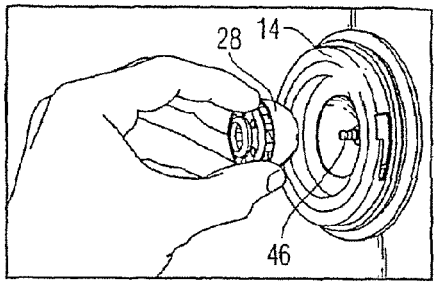
Figure 14:
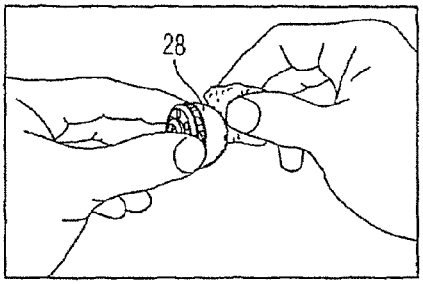
Figure 14:
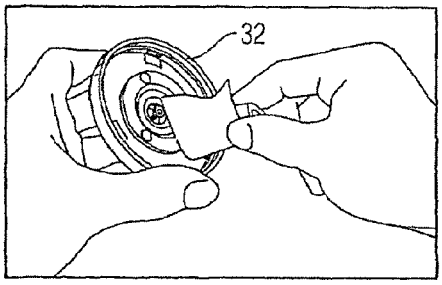
Figure 14:
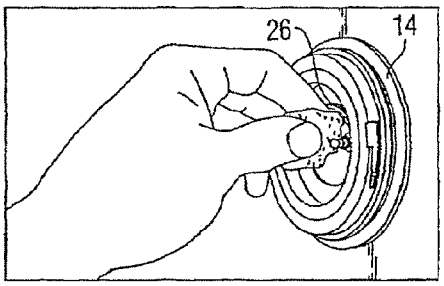
Figure 14:
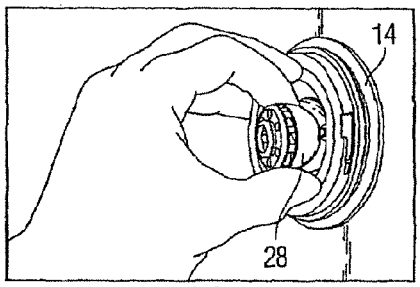
Figure 14:
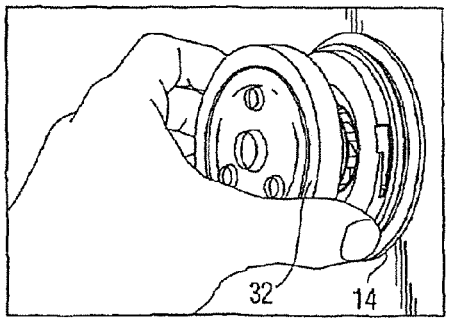

In a typical use (FIG. 14), the pedicure chair is prepared for a customer by manually twisting and removing the cap 32. The inner surface and outer surface of the cap 32 are wiped with a cloth/tissue having a sterilizing/cleaning material, such as alcohol, thereon. Alternately, the cap 32 may be immersed in a sterilizing/cleaning solution. The rotor 28 is manually removed from the stator 26 and cleaned/sterilized in a manner as performed with the cap 32. The stator 26 and the entire inner surface of the housing 14 are wiped with a cloth/tissue having a sterilizing/cleaning material thereon. The cleaned rotor 28 is replaced on the stator 26. Note that due to the magnetic nature of the rotor, it is strongly attracted to the stator. Simply disposing the rotor near the well in the stator is sufficient to have the rotor seat itself in the well with the post 46 in the well received in the bore 44 in the rotor. No tools or special handling are required. The cleaned cap is manually attached to the housing without the need for any tools. The interior of the basin is cleaned/sterilized by wiping with a cloth/tissue having a cleaning/sterilizing material thereon. A predetermined amount of water is placed in the basin. If desired, additional substances such as conditioners, medicaments, fragrances, etc. may be placed in the basin with the water. A customer is seated in the pedicure chair 10 with their feet oriented toward the at least one housing. The motor is activated to circulate the water in the basin and the water is circulated as required for the pedicure. After the pedicure procedure is completed and the customer leaves, the basin is emptied of water and the basin, cap, rotor and interior of the housing and stator are sterilized/cleaned using the above described procedure. The cleaning/sterilizing procedure is completed in approximately one minute or less.

In an alternate embodiment (FIGS. 17-20) the removable cap 32' has an inner surface *72'* and an outer surface *70'*. A rim 50 is formed circumferentially about the inner surface *70'*. At least one inlet opening 34' is formed centrally with the cap 32'. A circular wall 52 is formed on the inner surface surrounding the inlet opening 34'. At least one outlet opening 36' is formed through the cap 32' between the inlet opening 34' and the rim 50. In an embodiment having three (3) outlet openings 36', they are preferably spaced apart 120° from each other. On the outer surface *70'* of the cap, each outlet opening has a circumferential wall 42' formed thereabout. The wall 42' extends outwardly from the top surface of the cap forming a nozzle about the respective outlets 36'. Water expelled radially from the cap is directly axially and is projected from the nozzle into the basin. Preferably, the inlet opening 34' has a plurality of spaced-apart holes 54 arranged in a series of concentric circles. The series of spaced-apart holes are formed on a convex dome 56 extending above the outer surface of the cap 32'.

*Continuing with reference to FIGS. 17-20, and with particular reference to FIG. 20, an inner zone 100 of the cap inner surface 72' can be defined in the convex dome 56. As shown, the inner zone 100 curves and is inclined relative to a reference plane normal to an axis A of the cap 32'. A medial zone 102 of the cap inner surface 72' is radially outward from the inner zone 100. In the illustrated embodiment, the medial zone 102 is flat and parallel to the reference plane. An outer zone 104 of the cap inner surface 72' is radially outward from the medial zone 102. In the illustrated embodiment, the outer zone 104 is inclined relative to the reference plane. Also, the outlet openings 36' are formed through the cap inner surface 72' in the inclined outer zone 104. In the illustrated embodiment a portion of the outlet openings 36' are also formed through part of the medial zone 102. An engagement zone 106 of the cap inner surface 72' is radially outward from the outer zone 104. In the illustrated embodiment, the engagement zone 106 is parallel to the reference plane.*

Irrespective of the type of motor used in the housing, the inlet opening 34 in the cap 32 is centrally disposed so that the inlet opening is opposite the motor or the impeller and water is drawn from the basin 12 through the inlet opening 34.

*FIGS. 26 and 27 show a configuration in which the cap 32' embodiment of FIGS. 17-20 is fit onto motor 59. As shown, the cap 32' is attached to the housing 14' so that the engagement zone 106 of the cap inner surface 72' engages the front part of the housing 14' about its entire circumference. In this configuration, an interior chamber 110 is defined between the housing inner surface 80 and the inner surface 72' of the cap 32'. Also, and as shown, due to the inclination of the surfaces 80, 72', an axial distance between the cap inner surface 72' and the housing inner surface 80 decreases moving radially outwardly in the cap inner zone 100. Similarly, an axial distance between the cap inner surface 72' and the housing inner surface 80 decreases moving radially outwardly in the cap outer zone 104.*

*Further, and as shown in FIG. 27, the impeller 58 is arranged between the inlet opening 34' and the flat inner portion 84 of the housing inner surface 80. The outlet openings 36' through the cap 32' are aligned with the outer portion 90 of the housing inner surface 80 at and adjacent the outer edge 82. In the illustrated embodiment, the axially-directed outer edge part 94 of the housing inner surface 80 is aligned with a corresponding axially-directed portion of the outlet opening 36'. Also, due to inclined portions of the housing inner surface 80 and/or cap inner surface 72', a distance between the cap inner surface 72' and housing inner surface 80 at the outlet openings 36' is less than a distance between the cap inner surface 72' and housing inner surface 80 at the inlet opening 34'.*

Figure 15:
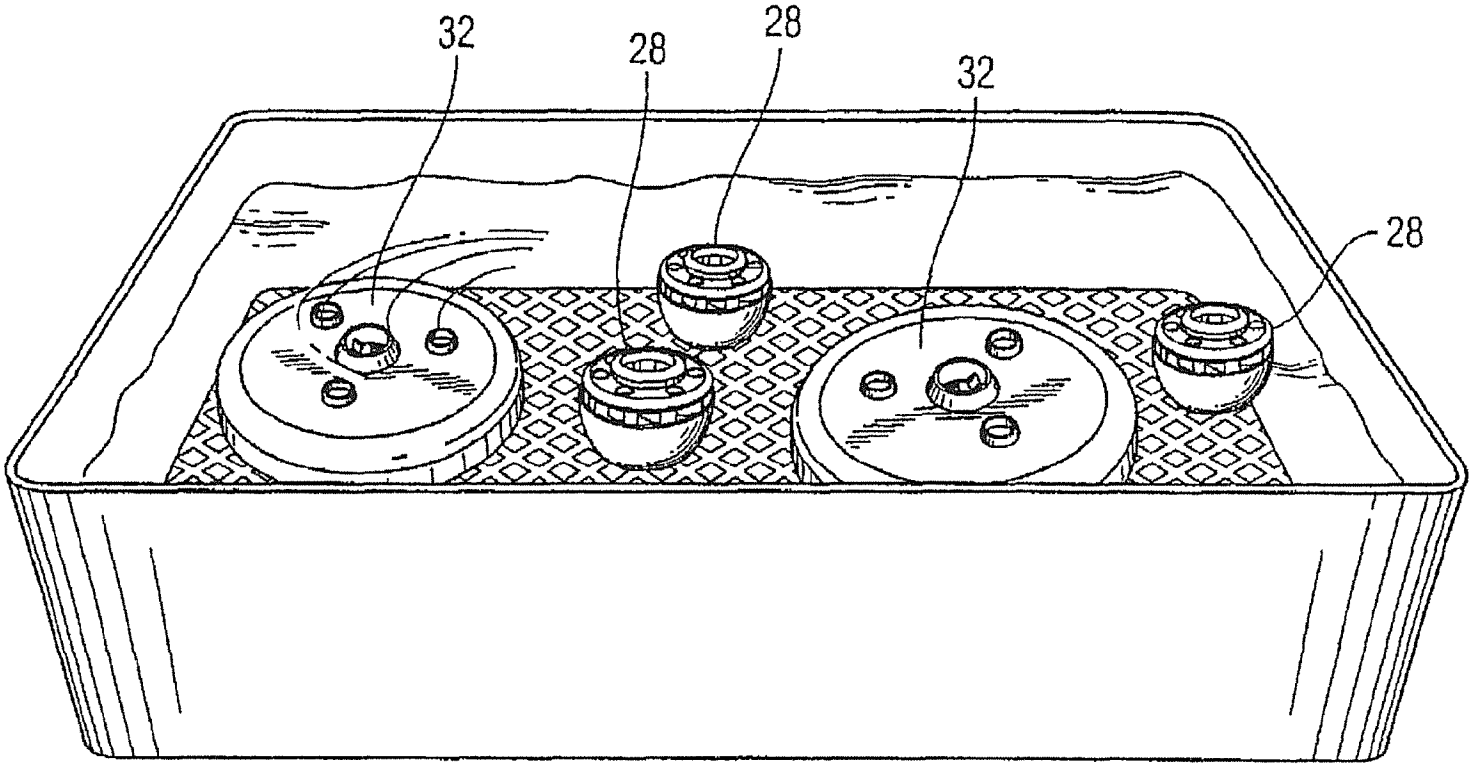
FIG. 15 is a perspective view showing a plurality of extra rotors and caps in a sterilizing solution to be used to rapidly prepare the basin for the next customer.
Figure 16:
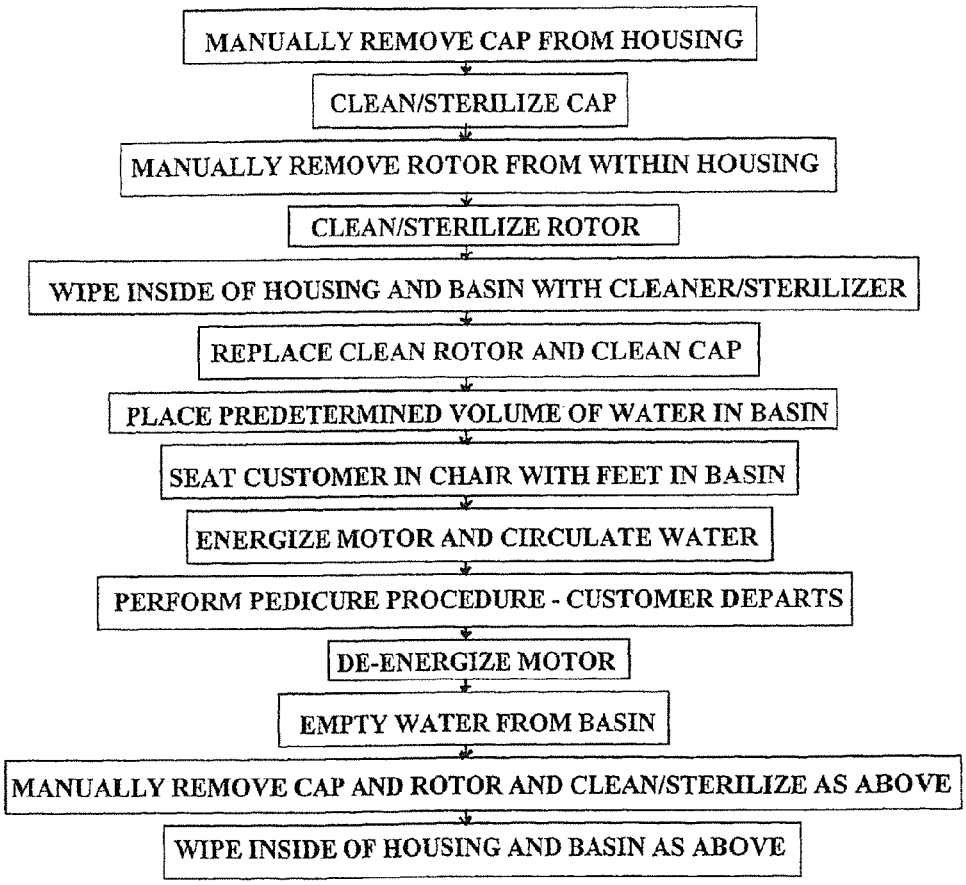
FIG. 16 is a flowchart showing the preparation and use of the pedicure chair incorporating the present invention.
Figure 22:
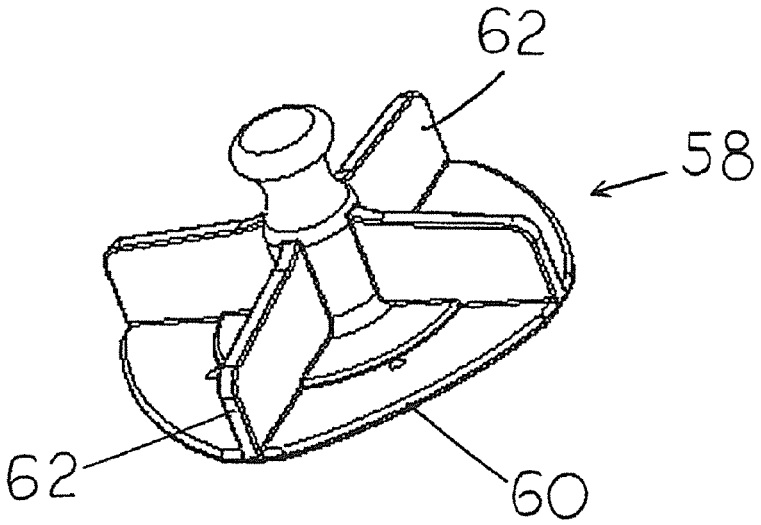
FIG. 22 is a perspective view of the top of the impeller.
Figure 23:
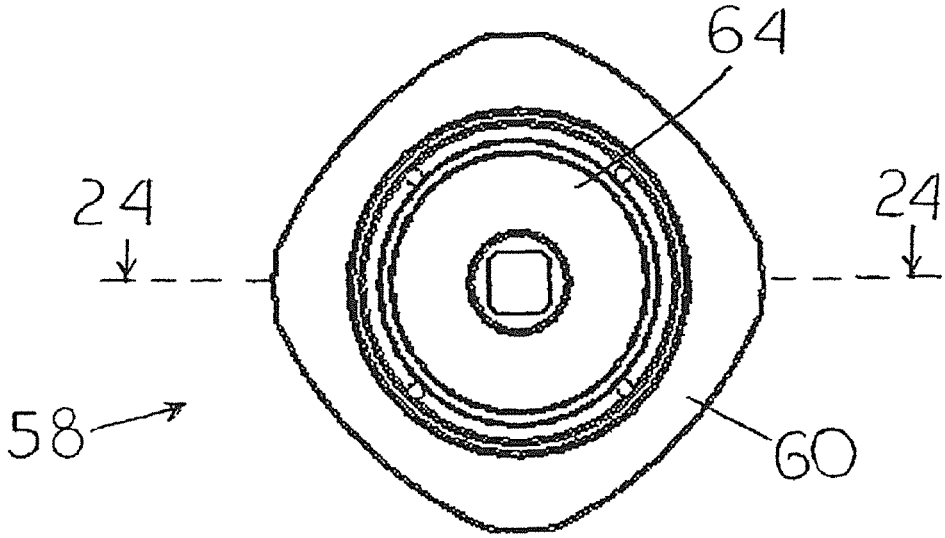
FIG. 23 is a bottom plan view of the impeller.
Figure 24:
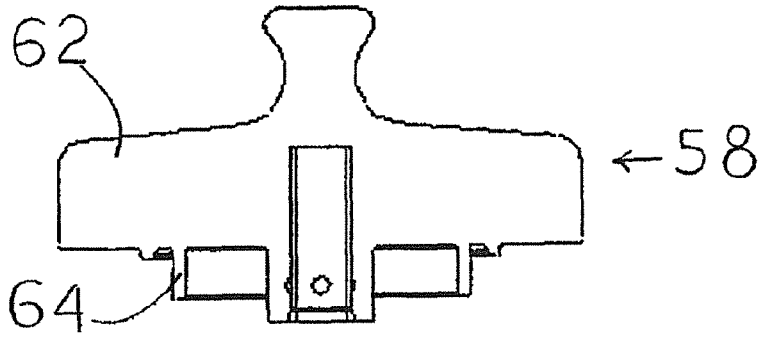
FIG. 24 is a cross-sectional view taken across the lines 24-24 of FIG. 23.
Figure 25:
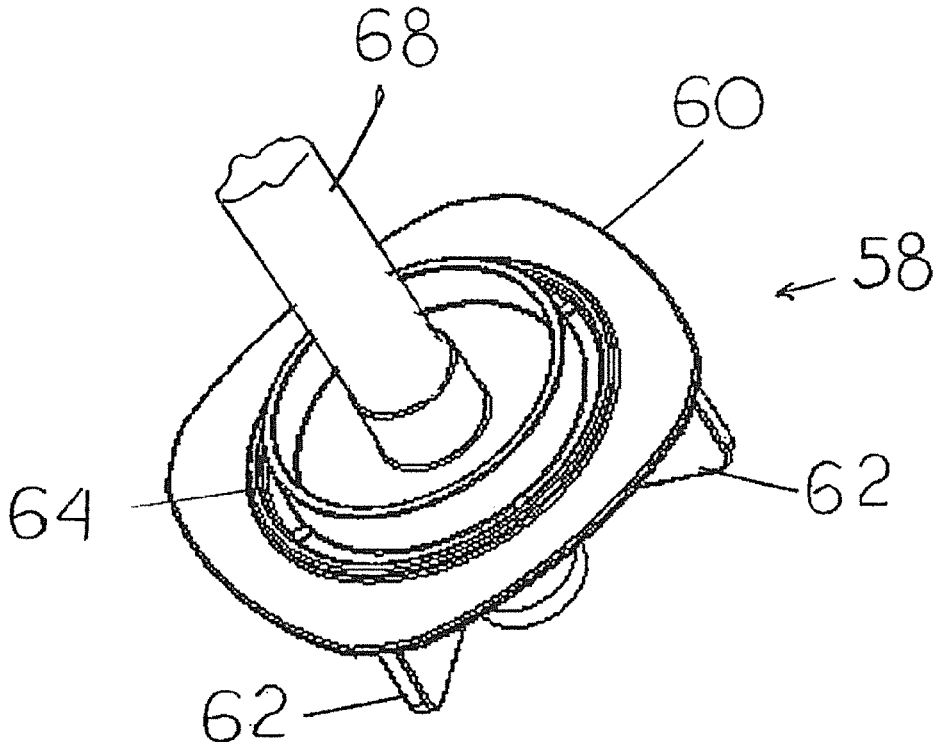
FIG. 25 is a perspective view of the bottom of the impeller.

Alternately, there could be provided additional caps and rotors which are maintained in a cleaning/sterilizing bath or are kept in a cleaned/sterilized condition (FIG. 15). These clean components cold be used to replace the caps and/or rotors which are to be cleaned. This would further shorten the time to clean the pedicure chair for the next customer. A diagrammatic flowchart of use is presented in FIG. 16.

In the current state-of-the-art, the basin may be wiped with a cloth/tissue having a sterilizing/cleaning material, but is not possible to adequately clean the motor/fan used to circulate the water. Further, in the present chairs, there are pipes through which the water circulates and it is not possible to adequately clean these thoroughly. The absence of dirt, mold or bacteria in these pipes and/or on the motor/fan cannot be assured. Thus, in the present chairs, the alternatives are 1) do not sterilize/clean which can produce unsanitary, dermatological problems for customers, 2) conduct a partial cleaning which is inadequate, or 3) conduct a thorough cleaning which may require approximately 20 minutes and cannot assure the cleanliness of the pipes.

The present invention provides a method of using a pedicure chair which assures that the bath for the customer is safe and sanitary and which can be prepared in a relatively short time.

Although the above description is directed to a pedicure chair, the device may be used in a jacuzzi, whirlpool bath or similar item.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

[1. A jet pump mounted in a basin of a pedicure chair, or whirlpool bath wherein water is circulated, the jet pump comprising:

a housing having an externally accessible removable cap, the cap having an outer surface and an inner surface, a rim formed circumferentially about the inner surface, an inlet opening for water formed centrally within the cap, a wall being formed circumferentially on the inner surface of the cap surrounding the inlet opening between the inlet opening and the rim, the wall extending from the inner surface of the cap and directed toward the motor, at least one outlet for water formed through the cap radially between the wall around the inlet opening and the rim, the at least one outlet having a nozzle thereabout formed on the outer surface of the cap whereby water is projected from the nozzle into the basin, the inlet opening having a plurality of spaced-apart holes, a motor having an impeller to draw water toward the motor, the motor being disposed within the housing, and the impeller being oriented opposite the inlet opening of the cap, wherein when the motor is activated, the impeller is rotated, the water is drawn through the water inlet and the water is expelled radially against the wall around the inlet opening, the water circulating within the cap and being directed axially outwardly through the at least one outlet.]

[2. The jet pump of claim 1, wherein the series of spaced-apart inlet holes are formed on a convex dome extending above the outer surface of the cap.]

[3. The jet pump of claim 1, wherein the impeller is manually removable for cleaning.]

*4. A jet pump sized and shaped for use in a basin of a pedicure chair or in a whirlpool bath wherein water is circulated, the jet pump comprising:*

*a housing supporting a motor rotatably coupled to an impeller so as to drive the impeller about an axis, the housing comprising a shoulder configured to mount the housing to a wall of the pedicure chair or whirlpool bath so that a housing front part extends into the basin;*

*a cap having an outer surface, an inner surface, and a circumferential rim, the cap releasably engaged with the housing front part so as to define an interior chamber between the cap inner surface and a housing inner surface of the housing front part, the cap comprising a plurality of spaced-apart holes formed through the cap and defining an inlet aligned with the axis, a wall being formed circumferentially on the inner surface of the cap surrounding the plurality of spaced apart holes of the inlet between the holes of the inlet and the circumferential rim, and an outlet opening between the inlet and the circumferential rim, the outlet opening having a nozzle thereabout, the nozzle formed on the outer surface of the cap;*

*the housing inner surface comprising a flat portion that lies in a plane normal to the axis and has a reference slope, and an inclined portion disposed radially outwardly from the flat portion, a first point on the inclined portion having a first slope that is greater than the reference slope, the housing inner surface terminating at an outer edge and having a second slope at or adjacent the outer edge, the second slope being greater than the first slope;*

*the outer edge being circular, the inner surface of the cap releasably engaging the outer edge so that the outlet opening is aligned with the housing inner surface at or adjacent the outer edge; and*

*the impeller disposed within the interior chamber and comprising a plurality of vanes that extend radially outwardly from the axis, the impeller being rotatable by the motor to draw water axially through the inlet and direct the water radially within the interior chamber so that the water flows over the inclined portion and through the outlet opening and nozzle, whereby water is projected from the nozzle into the basin.*

*5. A jet pump as in claim 4, wherein at least part of the flat portion of the housing inner surface is aligned with the inlet so that the impeller is interposed between the cap inner surface and the at least part of the flat portion of the housing inner surface.*

*6. A jet pump as in claim 4, wherein the impeller comprises a base on a side of the vanes opposite the cap inner surface, and wherein the flat portion of the housing inner surface is at or adjacent the base.*

*7. A jet pump as in claim 4, wherein the inclined portion of the housing inner surface has a radial length and has a constant slope along its radial length.*

*8. A jet pump as in claim 7, wherein an outer part of the housing inner surface at and adjacent the outer edge has an axial length and is parallel to the axis along its axial length.*

*9. A jet pump as in claim 7, wherein the impeller comprises a base on a side of the vanes opposite the cap inner surface, the base having a radius, and an outermost radius of the flat portion of the housing inner surface is no more than the impeller base radius.*

*10. A jet pump as in claim 9, wherein an innermost radius of the inclined portion of the housing inner surface is no more than the base radius, and an outermost radius of the inclined portion of the housing inner surface is greater than the base radius.*

*11. A jet pump as in claim 4, wherein an outer part of the housing inner surface at and adjacent the outer edge has an axial length and is parallel to the axis along its axial length.*

*12. A jet pump as in claim 11, wherein the slope of the housing inner surface increases moving radially from the flat portion toward the outer part.*

*13. A jet pump as in claim 4, wherein the impeller comprises a base on a side of the vanes opposite the cap inner surface, the base having a radius, and an outermost radius of the flat portion of the housing inner surface is greater than the impeller base radius.*

*14. A jet pump as in claim 13, wherein an innermost radius of the flat portion of the housing inner surface is greater than the impeller base radius.*

*15. A jet pump as in claim 13, wherein the slope of the housing inner surface increases moving radially from the flat portion toward the outer edge.*

*16. A jet pump as in claim 4, wherein the flat portion of the housing inner surface lies in the reference plane that is normal to the axis, a first point along the cap inner surface is defined at the inlet, and a second point along the cap inner surface is defined adjacent the outlet opening, wherein the first point and second point are spaced radially and axially relative to one another, and wherein a distance between the second point and the reference plane is less than a distance between the first point and the reference plane.*

*17. A jet pump as in claim 16, wherein the cap is convex at the inlet.*

*18. A jet pump as in claim 17, wherein a radially flat portion of the cap inner surface is interposed radially between the first point and the second point.*

*19. A jet pump as in claim 4, wherein the nozzle extends from the cap inner surface to a downstream nozzle opening that is spaced from the cap outer surface.*

*20. A jet pump sized and shaped for use in a basin of a pedicure chair or in a whirlpool bath wherein water is circulated, the jet pump comprising:*

*a housing supporting a motor rotatably coupled to an impeller so as to drive the impeller about an axis, the housing comprising a shoulder configured to mount the housing to a wall of the pedicure chair or whirlpool bath so that a housing front part extends into the basin;*

*a cap having an outer surface, an inner surface, and a circumferential rim, the cap releasably engaged with the housing front part so as to define an interior chamber between the cap inner surface and a housing inner surface of the housing front part, the cap comprising a plurality of spaced-apart holes formed through the cap and defining an inlet disposed at and adjacent the axis, a wall being formed by the inner surface of the cap between the plurality of spaced apart holes of the inlet and the circumferential rim, the wall extending circumferentially so as to substantially surround the holes, and an outlet opening is radially spaced from the inlet, the outlet opening communicating with a nozzle formed on the outer surface of the cap;*

*the housing inner surface extending radially outwardly from the axis and terminating at a circular outer edge, a first portion of the housing inner surface being radially spaced a distance from the axis and having a first slope relative to a plane defined normal to the axis, a second portion of the housing inner surface disposed radially outwardly from the first portion and defined at and adjacent the outer edge, the second portion of the housing inner surface at a point along the second portion having a second slope relative to a plane defined normal to the axis, the second slope being greater than the first slope;*

*the inner surface of the cap releasably engaging the circular outer edge so that the outlet opening is aligned with the second portion of the housing inner surface; and*

*the impeller disposed within the interior chamber and comprising a plurality of vanes that extend radially outwardly from the axis, the impeller being rotatable by the motor to draw water axially through the inlet and direct the water radially within the interior chamber so that the water flows over the first portion and second portion of the housing inner surface and is directed toward and through the outlet opening of the cap, and further through the nozzle and into the basin.*

*21. A jet pump as in claim 20, wherein the second portion of the housing inner surface at and adjacent the outer edge has an axial length and is parallel to the axis along its axial length.*

*22. A jet pump as in claim 21, wherein the slope of the housing inner surface increases moving radially from the first portion toward the second portion.*

*23. A jet pump as in claim 20, wherein a driveshaft extends from the motor and through an aperture in the housing inner surface into the interior chamber, and wherein the impeller is releasably attachable to the driveshaft.*

*24. A jet pump as in claim 20, wherein the cap comprises a second outlet opening spaced radially from the inlet and from the outlet opening, the second outlet opening aligned with the second portion of the housing inner surface at or adjacent the outer edge.*

*25. A jet pump as in claim 20, wherein an inner zone of the cap inner surface in the inlet has a first radial length and is inclined relative to the axis along the first radial length, a medial zone of the cap inner surface has a second radial length and is normal to the axis along the second radial length, and an outer zone of the cap inner surface has a third radial length and is inclined relative to the axis along the third radial length, the medial zone being between the inner and outer zones.*

*26. A jet pump as in claim 25, wherein the wall comprises the medial zone of the cap inner surface.*

*27. A jet pump as in claim 22, wherein a distance along the axis between the impeller vanes and the inner surface of the cap at the inlet is greater than a distance along the axis between the impeller vanes and the wall.*

*28. A jet pump as in claim 18, wherein a third point is defined along the wall, and a distance between the third point and the reference plane is less than a distance between the first point and the reference plane.*

*29. A jet pump as in claim 28, wherein the wall comprises the radially flat portion of the cap inner surface.*

*30. A jet pump as in claim 29, wherein the wall is defined by the inner surface of the cap.*

*31. A jet pump as in claim 4, wherein the wall is defined by the inner surface of the cap.*

*32. A jet pump as in claim 31, wherein a distance between the reference plane and the inner surface of the cap at the wall is less than a distance between the reference plane and the inner surface of the cap at the inlet.*

*33. A jet pump as in claim 31, wherein the wall extends in a direction transverse to the reference plane.*

* * * * *

UNITED STATES PATENT AND TRADEMARK OFFICE

CERTIFICATE OF CORRECTION

PATENT NO. : RE45,844 E
APPLICATION NO. : 13/946899
DATED : January 19, 2016
INVENTOR(S) : Christopher L. Luong It is certified that error appears in the above-identified patent and that said Letters Patent is hereby corrected as shown below:

TITLE PAGE

In column 1, item (12) "Reissued Patent", line 2, delete "Long" and insert -- Luong --, therefor.

In column 1, item (72) "Inventor", line 1, delete "Long" and insert -- Luong --, therefor.

IN THE SPECIFICATION

In column 1, line 53, delete "Elektro-werks" and insert -- Elektro-Werke --, therefor.

In column 3, line 19, delete "front" and insert -- from --, therefor.

In column 4, line 26, delete "Elektro-werks" and insert -- Elektro-Werke --, therefor.

Signed and Sealed this
Nineteenth Day of July, 2016

Michelle K. Lee

Michelle K. Lee
*Director of the United States Patent and Trademark Office*